US012798938B2

(12) United States Patent
Steger et al.

(10) Patent No.: US 12,798,938 B2
(45) Date of Patent: Nov. 17, 2026

(54) DEVICE FOR DETECTING A LOAD CARRIER CARRIED ON AN UNDERRIDE SHUTTLE

(71) Applicant: Jungheinrich Aktiengesellschaft, Hamburg (DE)

(72) Inventors: Fabian Steger, Burgheim (DE); Marius Leffler, Aichach (DE); Romano Wolf, Munich (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 632 days.

(21) Appl. No.: 18/325,594

(22) Filed: May 30, 2023

(65) Prior Publication Data

US 2023/0382702 A1 Nov. 30, 2023

(30) Foreign Application Priority Data

May 30, 2022 (DE) ..................... 10 2022 113 574.8

(51) Int. Cl.
*B66F 9/06* (2006.01)
*B66F 9/065* (2006.01)
*G05D 1/00* (2024.01)

(52) U.S. Cl.
CPC .............. *B66F 9/063* (2013.01); *B66F 9/065* (2013.01); *G05D 1/0066* (2013.01)

(58) Field of Classification Search
CPC ........ B66F 9/063; B66F 9/065; B66F 9/0755; G05D 1/0066; G01V 8/10; B65G 35/00; B65G 43/08; B65G 2203/042
See application file for complete search history.

(56) References Cited

U.S. PATENT DOCUMENTS 12,344,516 B2 * 7/2025 Mainz ..................... B66F 9/063
2021/0116230 A1 * 4/2021 Bocage .................... G01B 7/14

FOREIGN PATENT DOCUMENTS

EP 3511271 A1 * 7/2019 .............. B66F 9/063

* cited by examiner

*Primary Examiner* — Jacob S. Scott
*Assistant Examiner* — Miraj T. Patel
(74) *Attorney, Agent, or Firm* — Kilpatrick Townsend & Stockton LLP

(57) ABSTRACT

A device for detecting a load carrier carried on an underride shuttle, comprising a field of sensor units arranged on an outer side of the underride shuttle configured to detect a detection position of the load carrier and output a corresponding sensor bit depending on a presence of a predetermined property at the detection position, a memory unit storing data which produces an allocation of load carrier codes to respective load carrier types; and an evaluation unit, which is operatively coupled to the sensor units and the memory unit to receive the sensor bits output by the sensor units. The device further determines the load carrier code based in part on the sensor bits and determines the load carrier type of the currently carried load carrier based in part on the load carrier code and the data stored in the memory unit.

26 Claims, 2 Drawing Sheets

| Bit#1 | Bit #2 | Bit #3 | Bit #4 | Bit #5 | Code |
|---|---|---|---|---|---|
| 0 | 0 | 1 | 0 | 1 | 1 |
| 0 | 1 | 0 | 0 | 1 | 2 |
| 0 | 1 | 1 | 1 | 0 | 3 |
| 1 | 0 | 0 | 0 | 1 | 4 |
| 1 | 0 | 1 | 1 | 0 | 5 |
| 1 | 1 | 0 | 1 | 0 | 6 |
| 1 | 1 | 1 | 0 | 1 | not allowed |
| 1 | 0 | 1 | 0 | 1 | not plausible |

DEVICE FOR DETECTING A LOAD CARRIER CARRIED ON AN UNDERRIDE SHUTTLE

CROSS REFERENCE TO RELATED APPLICATION

This application claims priority to German Patent Application No. 10 2022 113 574.8, filed in Germany on May 30, 2022, the entire contents of which are hereby incorporated herein by this reference.

TECHNICAL FIELD

The present invention relates to a device for detecting a load carrier carried on an underride shuttle, an underride shuttle equipped with such a device, a system formed from such an underride shuttle and a load carrier, and a method for detecting a load carrier carried on an underride shuttle by means of such a device according to the invention.

BACKGROUND

As part of the increasing automation of logistics devices, so-called underride shuttles have recently gained importance, which can transport loads autonomously or semi-autonomously on their upper side, such as different types of pallets with goods carried thereon. In order to receive loads of this type, an underride shuttle drives underneath them at a transfer station and the corresponding bearing surface on the upper side of the underride shuttle is raised until the load is lifted off the transfer station, is supported on the underride shuttle and is then transported to a designated location and can be transferred again. Likewise, load carriers are known which can be picked up by such underride shuttles and can be transported without transfer stations by being designed similarly to a table and thus initially being able to stand on a plurality of legs or supports before the shuttle drives underneath them in a in a central portion and then transported. For this purpose, generic underride shuttles are generally set up to form an omnidirectional locomotion and are coordinated and controlled with respect to their operation via a control system.

Since the specific type of load carriers worn on such underride shuttles can have an influence on various workflows and/or operating parameters of the underride shuttle, for example by adapting an adaptation of a protected field spanned by environment sensors around the underride shuttle to the size or the projection of the load carrier with respect to an outline of the underride shuttle, it is desirable to be able to automatically recognize a type of a respective load carrier carried on an underride shuttle. Since safety-relevant operating parameters of the corresponding underride shuttle are affected in this case, it is further desirable to carry out the corresponding detection in a manner that can exclude faulty detections of load carriers with a high reliability. Furthermore, it is of course desirable to design a corresponding device cost-effectively and in a simple manner for installation and service.

SUMMARY

In order to achieve this object according to the invention, a device for detecting a load carrier carried on an underride shuttle is proposed, comprising a field of sensor units to be arranged on an outer side of the underride shuttle, each of which is configured to detect a respective detection position of the load carrier and to output a corresponding sensor bit depending on a presence of a predetermined property at the detection position, a memory unit in which data are stored which produce an allocation of load carrier codes to respective load carrier types; and an evaluation unit, which is operatively coupled to the sensor units and the memory unit and is designed to receive the sensor bits output by the sensor units to derive the load carrier code from at least a part of the sensor bits and to derive the load carrier type of the currently carried load carrier on the basis of the load carrier code and the data stored in the memory unit.

Thus, the device according to the invention is capable of providing a sufficient number of such sensor bits with a small number of sensor units, which in a robust manner only have to determine the presence or absence of a predetermined property at a detection position of the load carrier, that a certain quantity of different load carrier codes can be derived, which in turn enable the identification of the load carrier type on the basis of the data stored in the storage unit via mapping or reproducing of key-value pairs. In this case, an arrangement of the sensor units laterally on the vehicle is conceivable in principle when corresponding detection positions on the load carrier are provided, for example, on a vertically placed metal sheet and rest at least approximately flush on the vehicle when the load carrier is received. However, a preferred variant provides for an arrangement of the sensor units on an upper side of the underride shuttle, so that in the following, primarily such embodiments are presented.

Accordingly, a load carrier interacting with such a device is equipped with such detection positions at least one designated location, which positions in turn are to be matched to the respective functional principle of the sensor unit in the device and encode the corresponding type of the load carrier, in such a manner that the sensor units can each convert the presence or absence of the predetermined property into a corresponding sensor bit. It should already be mentioned at this point that both pallets, tables or other load carriers that can be fitted with a corresponding load and add-on components such as, for example, a so-called "backpack" that can be mechanically, electrically and/or electronically connected with the underride shuttle can act as load carriers in the sense of the present invention, said add-on components acting in turn as an interface for receiving certain types of pallets or loads on the upper side of the underride shuttle.

Although the field of sensor units can be configured in substantially any desired manner and the individual sensor units can also be arranged at any distance from one another at the upper side of the underride shuttle in any spatial orientations, it could be provided in a particularly simple embodiment of the present device to arrange the sensor units in a row. This enables a particularly space-saving Integration of the sensor units on the upper side of the underride shuttle.

However, the field of sensor units could alternatively also be divided in such a manner that at least one of the sensor units is arranged at a distance from the remaining sensor units, in particular is arranged in a diagonally opposite region to the remaining sensor units in relation to an outline of the underride shuttle. As a result, it can be ensured that a corresponding load carrier is detected by the sensor units only in a correct orientation, in particular with respect to its angle to the vehicle body of the underride shuttle, at all of its detection positions. Thus, by such a division of the field of sensor units into a plurality of mutually spaced and in particular diagonally opposite groups of at least one sensor unit each, an additional safety mechanism is created with respect to a correct reception of the load carrier on the underride shuttle.

Furthermore, the number of sensor bits that can be processed by the device are determined by the number of sensor units which can be processed by the device, which in turn is reflected directly in the number of the maximum distinguishable or manageable load carrier types. Since further information can be encoded in the sensor bits via a pure representation of a binary number, as will be explained further below, it can be advantageous if at least five sensor units are included in the field of sensor units.

As already briefly indicated, the evaluation unit can also be configured to perform a plausibility check of the determined load carrier code on the basis of at least a portion of the received sensor bits. In this case, it is possible to imagine different techniques, for example it can be required that for the validity of a load carrier code, this always has to comprise the same number of one-bits and zero-bits, or a portion of the sensor bits can be used for encoding the load carrier code, while the other sensor bits can be evaluated in a suitable manner for a safety function in the context of a plausibility check.

Furthermore, in the device according to the invention for simplified assembly and cost-effective production thereof, it can be provided that the sensor units each be provided in an identical manner, and/or as inductive sensors. In such an embodiment of the sensor units as inductive sensors, either a portion made of a metallic material or a corresponding recess or a portion made of non-metallic material would then be provided on a load carrier to be detected at the respective detection positions for the individual sensor units. If the load carrier itself is formed from metal, the two states can be realized in accordance with a zero-bit and a one-bit load carrier side via recesses or bores, wherein "bore" would then correspond to one of the possible states and "bore not present" to the respective other state. Such inductive sensors have the advantage that they are very robust and operate reliably.

In this context, an embodiment could also be considered in which such inductive sensors are inserted together with movable, pre-stressed metal pins in a guide on the outside of the underride shuttle, wherein the metal pins are displaced or pressed in during contact with the load carrier and their position is detected by means of the inductive sensors. In such a solution, which combines mechanically displaceable elements with an inductive measurement, the sensor position could accordingly be displaced into the vehicle interior and the sensor arrangement could be horizontal In the vehicle instead of vertical, if this should be desirable, for example, due to geometric specifications.

Furthermore, the present invention relates to an underride shuttle comprising a vehicle body with a bearing surface, which is provided to be adjustable in height on its upper side, and of a device according to any of the preceding claims, wherein the sensor units of the device are integrated in the bearing surface. In this manner, the integration of the sensor units necessary for a function of the device on the upper side of the underride shuttle is achieved in such a manner that a load carrier which can be lifted with the bearing surface provided in a height-adjustable manner can be present in the detection region of the individual sensor units with its detection positions.

Since a precise positioning of the detection positions with respect to the field of sensor units is necessary for correct detection of the load carrier in the state worn on the underride shuttle, it can be advantageous to provide at least one centering unit on the bearing surface of the underride shuttle, which centering unit is designed to mechanically center a supported load carrier to a desired orientation with respect to the bearing surface. Of course, it could also be ensured by other measures that a correct orientation of the sensor units to the detection positions is guaranteed, for example by means of an optical detection and validation of the relative position of such a load carrier on the bearing surface.

Furthermore, the underride shuttle according to the invention can further be configured to adapt at least one operating parameter depending on the load carrier type derived by the evaluation unit. In this case, it is specifically possible to provide an adaptation of a size and/or shape of protected areas defined by environment sensors (scanner units) provided on the underride shuttle, within which no external objects may be located in order to avoid collisions, or also a determination of a maximum speed and in particular a curve speed depending on the detected load carrier type, which in turn has an influence on maximum external dimensions and/or a maximum weight of the load carried on the load carrier.

According to a further aspect, the present invention relates to a system formed from an underride shuttle of the type just described as well as a load carrier, wherein the load carrier is provided on at least one portion of its underside with a field of detection positions which can be detected by the sensor units of the device for detecting the load carrier carried on the underride shuttle, while the load carrier is received in a desired orientation with respect to the bearing surface. As already mentioned above, the load carrier can be different types of pallets, tables and the similar, but on the other hand also add-on components for the upper side of the underride shuttle.

As also already indicated above, either a metallic surface or a bore can be present at the detection positions in order to enable detection by means of sensor units designed as inductive sensors. Here, it should be pointed out at this point that, in principle, other types of sensor can also be used in the device according to the invention, for example optical sensors which, in a similar manner, could likewise detect the presence or absence of a metallic surface or other optically detectable properties in the respective detection regions.

Since underride shuttles are frequently constructed in such a manner that their bearing surfaces have a substantially square outline in order to be as flexible as possible with regard to possible orientations relative to load carriers and during a locomotion, it can be advantageous if the load carrier associated with the invention comprises four identical fields of detection positions in order to enable a respective detection of one of these fields in four orientations of the load carrier with respect to the bearing surface of the underride shuttle, which orientations are rotated by 90° in each case. On the other hand, in other embodiments with a lower symmetry, only two identical fields of detection positions could also be provided, for example if the load carrier types are elongated pallets which can be received only in two orientations rotated by 180° relative to each other, or even only a field of detection positions where only one individual possible relative positioning of the load carrier with respect to the underride shuttle is conceivable.

In principle, it would also be conceivable, in a reverse manner, to provide several similarly constructed sensor fields on the underride shuttle, but only a field of detection positions on the load carrier, in order to allow a receptacle of the load carrier in a plurality of orientations to the underride shuttle in a similar manner, in each of which a detection of the load carrier is possible. However, this alternative would be associated with comparatively higher costs and higher structural complexity.

Further, as a further safety measure, it is conceivable to provide both the sensor units on the underride shuttle and the field of detection positions on the load carrier in each case several times and can be pre-set to successfully detect a load carrier that the respective load carrier codes represented by the corresponding sensor bits must be identical.

Furthermore, it may be required as a safety mechanism that the detection positions of the load carrier to be used for determining the load carrier code comprise at least one detection position in which the predetermined property is present and also at least one detection position in which the predetermined property is not present. This corresponds to an output of the field of sensor units in which at least one zero-bit and one-bit are present. In this manner, cases can be avoided in which, due to an incorrect positioning of the load carrier on the underride shuttle, all of the sensor units report the presence or absence of the predetermined property, that is to say, for example, in the specific case of interaction of inductive sensors and metallic portions or bores, a large-area support of a metallic portion over all detection areas of the sensor units or a detection of an absence of any metallic portions in two conceivable defective positioning of the load carrier with respect to the field of sensor units.

According to a further aspect, the present invention relates to a method for detecting a load carrier carried on an underride shuttle by means of a device according to the invention, as described further above, comprising the steps of detecting respective detection positions of a load carrier by the field of sensor units of the device, outputting corresponding sensor bits depending on the respective detection result by the sensor units, ascertaining a load carrier code from the sensor bits by the evaluation unit and discharging the load carrier type of the currently worn load carrier on the basis of the load carrier code and the data stored in the storage unit by the evaluation unit.

In this case, in the context of this method according to the invention, it can further be required that initially a lifting of the load carrier is carried out by the sensor units before the step of detecting, wherein in such a state it should be ensured that the correct positioning of the load carrier with respect to the bearing surface of the underride shuttle and thus the field of sensor units is present.

Furthermore, after the removal of the load carrier type of the currently worn load carrier, the method according to the invention can comprise outputting an instruction for adapting at least one operating parameter of the underride shuttle depending on the load carrier type derived by the evaluation unit by the evaluation unit. In this case, it is understood that, for example, if the evaluation unit of the device is integrated or operatively coupled to a central control unit of the underride shuttle, this instruction can be further used directly by the central control unit in order, for example, to be able to carry out the adjustment of protective fields or maximum permissible speeds already described above.

Furthermore, as also already mentioned above, only a part of the sensor bits can be used for determining the load carrier code, while a plausibility check of the determined load carrier code is carried out on the basis of the remaining sensor bits.

In this context, it can be considered, for example, that the sensor bits determined for the plausibility check of the determined load carrier code represent the number of sensor bits used for determining the load carrier code, in which the predetermined property is present, i.e. the number of one-bits or zero-bits in the sensor bits used for determining the load carrier code.

In a specific example, a group of three sensor bits can be used for determining the load carrier code and a group of two further sensor bits can be used for checking the plausibility of the load carrier code, wherein in each of the two groups at least one zero-bit and one one-bit must be present, and the sensor bits represent the number of one-bits in the sensor bits for the purpose of plausibility checking. In such a configuration of a method according to the invention, a total of six different load carrier codes can accordingly be encoded by means of five sensor bits, wherein the additional plausibility check prevents incorrect determination of the load carrier type in such a method in practice. Since this number of distinguishable load carrier types is generally sufficient, such an embodiment with five sensor units and a corresponding processing of the supplied data within the scope of two groups of three or two sensor bits represent a compact and cost-effective solution which is particularly suitable for practice and has the highest reliability.

Finally, it is pointed out that in the case of a determination of a non-plausible load carrier code by the evaluation unit, a corresponding error message can be output by the evaluation unit, which in turn, for example, can trigger a warning for a human operator of a control system that monitors the function of the underride shuttle or can also lead to immediate shutdown of the corresponding underride shuttle in order to initially carry out an error analysis by a human operator. In this case, a non-plausible load carrier code can comprise, depending on the design of the determination of the load carrier code from the sensor bits, for example, cases in which all of the bits are zero-bits or one-bits in the manner described above and/or the group of sensor bits is in opposition to the group of sensor bits for determining the load carrier code in order to check the plausibility of the load carrier code.

BRIEF DESCRIPTION OF THE DRAWINGS

Further features and advantages of the present invention will become even clearer from the following description of an embodiment, when said embodiment is considered together with the accompanying drawings. In detail, the drawings show.

DETAILED DESCRIPTION

Figure 1:
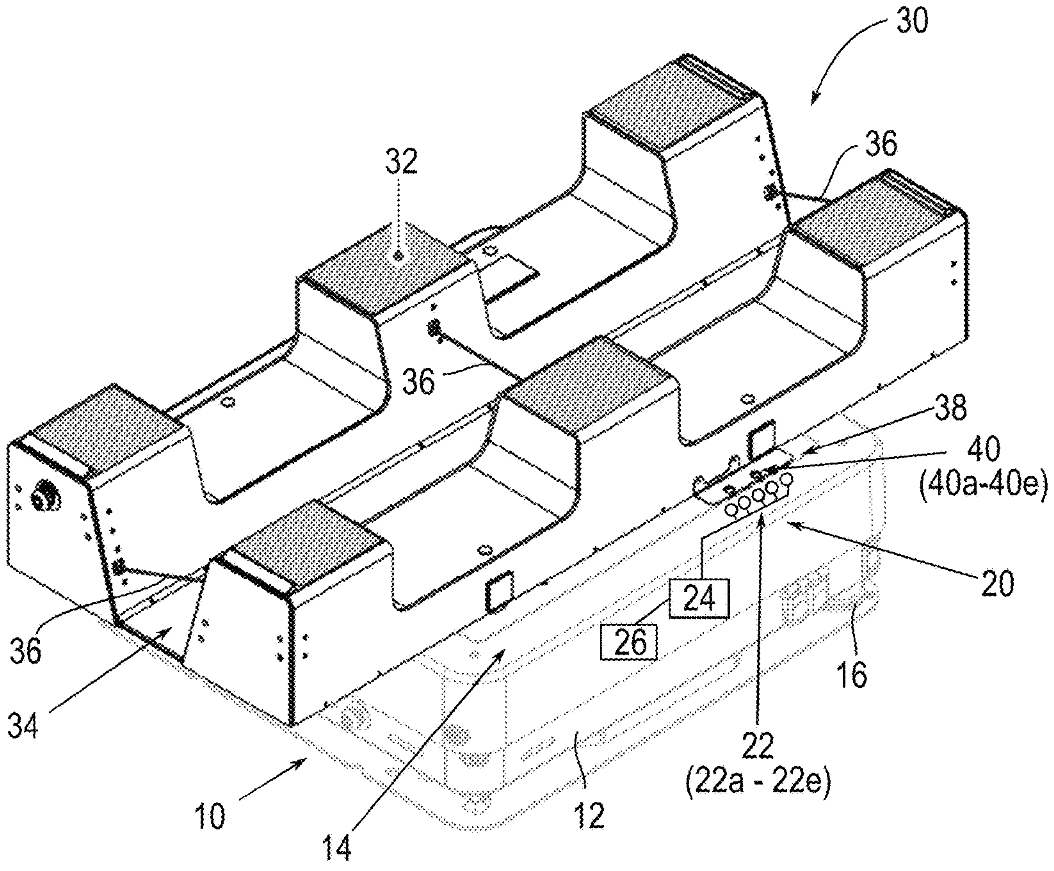
FIG. 1 an isometric view of an inventive underride shuttle with a first type of load carrier supported thereon.

In FIG. 1, initially an inventive underride shuttle is shown in an isometric view and is generally denoted by reference numeral 10. In a known manner, the underride shuttle 10 comprises a vehicle body 12 with a bearing surface 14, which is provided in a vertically displaceable manner on its upper side, a motion system (not shown) which enables, for example, an omnidirectional movement by means of a plurality of partially steerable wheels standing on a driving base, and laser scanners 16 provided at the respective corners of the underride shuttles 10, which define respective protective fields in which no external objects are allowed to be located in a regular operating state of the underride shuttle 10 in order to be able to ensure safe driving and functioning thereof.

Furthermore, the underride shuttle 10 is equipped with a device 20 for detecting a load carrier 30 supported on the underride shuttle 10, wherein the device 20 comprises a field 22 of sensor units 22*a* to 22*e* arranged on the upper side of the underride shuttle 10, which sensor units can in particular be designed as inductive sensors of the same type. With these sensor units 22*a* to 22*e* it is possible to detect the presence of a predetermined property at a respective detection position of the load carrier 30 and to output a corresponding sensor bit.

For this purpose, the device 20 further comprises an evaluation unit 24, shown merely schematically in FIG. 1, as well as a memory unit 26 assigned thereto, which are configured to initially determine a load carrier code from the sensor bits output by the sensor units 22*a* to 22*e* in a manner described below and to derive the load carrier type of the currently worn load carrier 30 on the basis of this load carrier code and data stored in the storage unit.

It should be pointed out here that the evaluation unit 24 and/or the memory unit 26 can each be integrated or operatively coupled to a central control unit of the underride shuttle 10, so that on the one hand an improved Integration of the corresponding components and functionalities and on the other hand direct further processing of the determined load carrier type are made possible.

In the view shown in FIG. 1, the load carrier 30 is designed as a so-called "backpack" and serves as an interface for receiving a pallet, in particular a Euro pallet. In this case, the load carrier 30 has a number of support portions 32, on which the corresponding Euro pallet can be carried, and a central recess 34, in which the middle board and the middle blocks of the Euro pallet can lie in the carried state. Furthermore, the load carrier 30 is equipped with a total of three light barriers 36, which are provided for ensuring correct positioning of the pallet to be supported by the load carrier 30.

Furthermore, it should be pointed out that a metallic sheet metal portion 38 is assigned to the load carrier 30 in such a manner that it lies in the region of the field 22 of sensor unit in the configuration shown, in which the load carrier 30 is fastened to the bearing surface 14 by means of a connecting unit (not shown) in which the load carrier 30 is attached by means of a connecting unit (not shown). In this case, a field 40 of detection positions 40*a*-40*e* is accordingly assigned to the metal sheet 38, wherein respective bores are provided at two of the detection positions, while the remaining metal sheet 38 is formed continuously, so that the remaining sensor units of the field 22 of sensor unit at the corresponding points are able to determine the presence of a predetermined property, that is to say a metallic surface in its detection region.

Accordingly, by means of the arrangement and number of such bores in the field 40 of detection positions, a coding of the type of the load carrier 30 can be undertaken, which can first be converted into sensor bits by means of the individual sensor units 22*a* to 22*e* of the field 22 of sensor units and can subsequently be translated by the evaluation unit 24 on the basis of the data stored in the memory unit 26 into a load carrier type.

Figure 2:
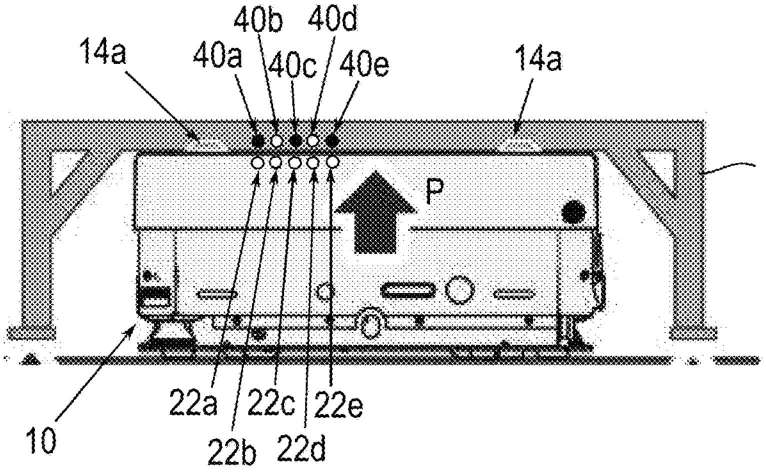
FIG. 2 a side view of the underride shuttle from FIG. 1 with a second type of load carrier supported thereon.

FIG. 2 now shows in a side view the underride shuttle 10 from FIG. 1, as it carries a second type of load carrier 30', which is designed as a table on which, for example, individual objects can be placed and consequently transported by means of the underride shuttle. In this view, it can also be seen that two centering units 14*a* are provided on the bearing surface 14 of the underride shuttle 10, which is movable vertically according to the arrow P shown in FIG. 2, which co-centering units interact with corresponding recesses in the load carrier 30' in order to ensure a correct relative positioning of the load carrier 30' with respect to the underride shuttle 10 and thus the device 20 for detecting the load carrier 30' supported on the underride shuttle 10.

From this device 20, the five sensor units 22*a* to 22*e* are indicated only schematically in FIG. 2, which in the configuration shown again lie opposite a corresponding field 40 of detection positions 40*a*-40*e* on the load carrier 30'. Since the load carrier 30' can itself be formed from metal in the region of the detection positions 40*a*-40*e*, individual bores can be provided at the corresponding detection positions in a manner similar to that in the metal sheet 38 from the embodiment of FIG. 1 in a field 40 of detection positions 40*a*-40*e*, which represent a first type of bit, while the remaining metal surface at the remaining detection positions can stand for the other type of bit, wherein a distinction is again made between the two possible states by an inductive measurement by the individual sensor units 22*a*-22*e*. In this case, in FIG. 2 the bores at the detection positions 40*b* and 40*d* are indicated by unfilled circles, while the continuous metal surfaces at the remaining detection positions 40*a*, 40*c* and 40*e* are each shown as filled circles.

Figures 3, 4:
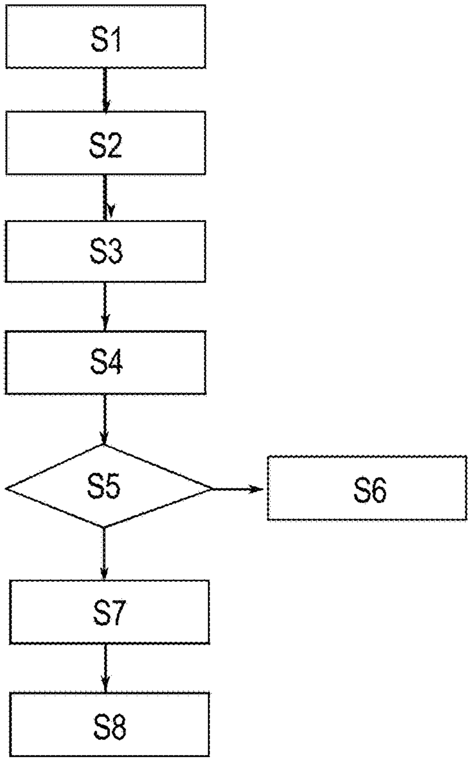
FIG. 3 a flow chart of a method according to the invention for detecting a load carrier carried on an underride shuttle.
FIG. 4 a schematic plan view of an alternative variant of an inventive underride shuttle as well as an associated load carrier.

With reference to FIG. 3, a method is now explained by means of which the load carrier 30 or 30' carried on the underride shuttle can be assigned to a load carrier type in the configurations from FIGS. 1 and 2. First, in step S1, the respective load carrier 30 is mounted on the upper side of the underride shuttle 10 or the bearing surface 14 is raised in order to lift the load carrier 30' into correct relative positioning. Subsequently, in step S2, the sensor units 22*a* to 22*e* detect their respective detection positions on the load carrier 30 or 30' and output corresponding sensor bits in step S3 to the evaluation unit 24 depending on the respective detection result.

This evaluation unit 24 now applies a suitable algorithm in order to determine a load carrier code from the sensor bits in step S4, wherein a plausibility check of the load carrier code thus determined takes place in step S5. If, in this plausibility check, it is found in step S5 that the determined load carrier code is not plausible ("no" in step D5), then in step S6 a corresponding error message is output by the evaluation unit, which error message can trigger a shutdown of the underride shuttle 10, depending on the embodiment or variant, the request for a manual check by an operator or the like.

If, on the other hand, it is determined in step S5 that the determined load carrier code is plausible ("yes" in step S5), the evaluation unit 24 is derived in step S7 from the load carrier code and the data of the load carrier type stored in the memory unit 26, that is to say, for example, whether it is the load carrier from FIG. 1 or the load carrier 30' from FIG. 2. Depending on the derived load carrier type, an adaptation of at least one operating parameter of the underride shuttle 10 can ultimately take place in step S8, for example an adaptation of the protection fields of the scanner units 16 or a determination of a maximum speed or curve speed of the drive system of the underride shuttle 10.

Furthermore, reference is made to the following Table 1, in which a specific implementation of the load carrier codes and the plausibility verification bits is explained. In this case, the first to third sensor bits, which can be delivered, for example, by the sensor units 22*a* to 22*c* in the embodiment of the device 20 shown in FIGS. 1 and 2, serve to determine the load carrier code, while the fourth and fifth sensor bits, corresponding to the sensor units 22*d* and 22*e*, serve to check the plausibility.

TABLE 1

| Bit#1 | Bit#2 | Bit#3 | Bit#4 | Bit#5 | Code |
|---|---|---|---|---|---|
| 0 | 0 | 1 | 0 | 1 | 1 |
| 0 | 1 | 0 | 0 | 1 | 2 |
| 0 | 1 | 1 | 1 | 0 | 3 |
| 1 | 0 | 0 | 0 | 1 | 4 |
| 1 | 0 | 1 | 1 | 0 | 5 |
| 1 | 1 | 0 | 1 | 0 | 6 |
| 1 | 1 | 1 | 0 | 1 | not allowed |
| 1 | 0 | 1 | 0 | 1 | not plausible |

In this case, it is pointed out that according to this embodiment a total of six load carrier types can be distinguished, since additional safety functions are implemented in the five sensor bits, although these safety functions reduce the number of combinations available for coding the load carrier types, but ensure significantly increased safety.

In particular, the permissible combinations of sensor bits which are shown in lines 1 to 6 of the table and accordingly correspond to the six different possible codable load carrier types, always contain at least one one-bit and one zero-bit in each case in the first to third bits and in the fourth and fifth bits, such that under no circumstances will all bits in one of the two groups be present as one or as zero. Furthermore, the sensor bits 4 and 5 used for the plausibility check of the determined load carrier codes each represent the number of one bit present in the first to third sensor bits used for determining the load carrier code, since the lines 1, 2 and 4 of the table 1 each comprise a single one-bit and two zero-bits in the first to third bits, while in each case two one-bits and one zero-bit are present in the lines 3, 5 and 6.

This relationship is plausibilized by the fourth and fifth bits, which accordingly map a parity of the first to third bits. Only for comparison there are a seventh and eighth line inserted into Table 1, both of which both do not represent a permissible or plausible combination of sensor bits and would accordingly in the method from FIG. 3 lead to an error message output in S5, since in line 7 all first to third bits are respectively identical and are also not compatible with the parity bits 4 and 5, while in the eighth line an allowable combination of one- and zero-bits is present in the first to third bits, but this is not plausible with the fourth and fifth parity bits in the manner described above.

FIG. 4 finally shows a schematic plan view of an alternative variant of a underride shuttle 10' according to the invention and of an associated load carrier 30", wherein at this point only the differences from the variant from FIG. 1 are to be discussed, and the components described in this context are each denoted by the same reference numerals, each supplemented by an apostrophe. For a description of the other components and the basic mode of operation of the underride shuttle 10' and the device 20' associated with it for detecting the load carrier 30" received on the underride shuttle 10', reference is made to the above observations in connection with FIGS. 1 to 3.

Accordingly, it should be pointed out that the device 20' used in the underride shuttle 10' is constructed in contrast to that of FIG. 1 with respect to its field of sensor units 22*a*'-22*e*' in such a manner that the field comprises two spaced-apart groups 22*a*' and 22*b*' and 22*c*'-22*e*' of sensor units which are diagonally opposite one another in relation to the outline of the underride shuttle 10'.

The advantage of this distributed arrangement of the sensor units 22*a*'-22*e*' is that only when the load carrier 30" is correctly aligned with respect to the underride shuttle 10', a detection of all of the corresponding detection positions 40*a*'-40*e*' on the load carrier 30" is carried out. To illustrate this additional safety mechanism, in FIG. 4 the load carrier 30" is shown rotated by an angle of only 3° relative to its target orientation with respect to the underride shuttle 10', and it is shown that, although the two detection positions 40*a*' and 40*b*' are still recognized by the corresponding sensor units 22*a*' and 22*b*', this is no longer true for the further detection positions 40*c*'-40*e*' which now lie outside the respective sensor region of the sensor units 20*c*'-20*e*'.

Furthermore, FIG. 4 shows three additional hypothetical detection positions 40F which are not provided on the load carrier 30 and which would therefore correspond to a linear arrangement of the detection regions analogous to the variant from FIG. 1. It can be gathered from this that these non-provided detection regions would likewise be detected by additional sensor units arranged correspondingly in a linear extension of the sensor units 22*a*', 22*b*', since the angle of 3° between the load carrier 30" and the underride shuttle 10' is too small in order to achieve a significant offset in relation to the corresponding sensor units in the region covered by the detection positions 40F.

By contrast, due to the increased distance between the groups of detection positions 40*a*', 401D' and 40*c*'-40*e*, the resulting displacement relative to the correct position of the load carrier 30" is sufficient to move the detection positions 40*c*'-40*e*' out of the sensor region of the sensor units 22*c*'-22*e*'. Accordingly, a defective positioning of the load carrier 30" relative to the underride shuttle 10' can accordingly be determined, for example, according to the functional principle discussed above with the aid of the plausibility check bits and corresponding countermeasures can be taken.

The invention claimed is:

1. A device for detecting a load carrier supported on an underride shuttle, comprising:

a field of sensor units arranged on an outer side of the underride shuttle, each sensor unit configured to detect a respective detection position of the load carrier and to output a corresponding sensor bit depending on a presence of a predetermined property at the detection position;

a memory unit storing data to allocate load carrier codes to respective load carrier types; and an evaluation unit operatively coupled to the sensor units and the memory unit, located on the underride shuttle, and configured to:

receive sensor bits output by the sensor units, to determine a load carrier code from at least one portion of the sensor bits; and derive, based on the load carrier code and data stored in the memory unit, a load carrier type of a currently carried load.

2. The device according to claim 1, wherein the sensor units are arranged in a row.

3. The device according to claim 1, wherein the field of sensor units is divided in such a manner that at least one of the sensor units is arranged at a distance from the remaining sensor units.

4. The device according to claim 1, wherein the field of sensor units includes at least five sensor units.

5. The device according to claim 1, wherein the evaluation unit is further configured to carry out a plausibility check of the determined load carrier code based in part on at least one of the received sensor bits.

6. The device according to claim 1, wherein the sensor units are formed in an identical manner.

7. The device according to claim 1, wherein at least one operating parameter comprises a size of at least one protected field of the underride shuttle.

8. The device according to claim 1, wherein at least one more operating parameter comprises a maximum speed of the underride shuttle.

9. The device according to claim 8, wherein the maximum speed is a maximum curve speed.

10. The device according to claim 1, wherein the field of sensor units is divided in such a manner that at least one of the sensor units is arranged in a diagonally opposite region to the remaining sensor units in relation to an outline of the underride shuttle.

11. The device according to claim 1, wherein the sensor units comprise inductive sensors.

12. An underride shuttle, comprising:
- a vehicle body having a bearing surface which is adjustable in height on its upper surface
- a field of sensor units integrated in the bearing surface of the vehicle body, each sensor unit configured to detect a respective detection position of a load carrier when supported on the underride shuttle and to output a corresponding sensor bit depending on a presence of a predetermined property at the detection position;
- a memory unit storing data to allocate load carrier codes to respective load carrier types; and
- an evaluation unit, located on the underride shuttle, operatively coupled to the sensor units and the memory unit, and configured to:
  - receive sensor bits output by the sensor units
  - determine a load carrier code from at least one portion of the sensor bits; and
  - derive, based on the load carrier code and data stored in the memory unit, a load carrier type of the load carrier when supported on the underride shuttle based in part on the load carrier code and the data stored in the memory unit.

13. The underride shuttle according to claim 12, wherein at least one centering unit is provided on the bearing surface, which centering unit is designed to center the load carrier when supported on the underride shuttle to a target orientation with respect to the bearing surface.

14. The underride shuttle according to claim 12, wherein the underride shuttle is further configured to adapt at least one operating parameter depending on the load carrier type derived by the evaluation unit.

15. The underride shuttle according to claim 14, wherein the at least one operating parameters comprises a maximum speed of the underride shuttle.

16. A system comprising an underride shuttle and a load carrier,
- wherein the underride shuttle comprises:
  - a vehicle body having a bearing surface which is adjustable in height on its upper surface;
  - a field of sensor units integrated in the bearing surface of the vehicle body, each sensor unit configured to detect a respective detection position of the load carrier and to output a corresponding sensor bit depending on a presence of a predetermined property at the detection position;
  - a memory unit storing data to allocate load carrier codes to respective load carrier types; and
  - an evaluation unit, located on the underride shuttle, operatively coupled to the sensor units and the memory unit, and configured to:
  - receive sensor bits output by the sensor units; determine a load carrier code from at least one portion of the sensor bits; and
  - derive, based on the load carrier code and data stored in the memory unit, a load carrier type of the load carrier based in part on the load carrier code and the data stored in the memory unit; and
- wherein the load carrier is carried on the underride shuttle and is provided on at least one portion of its underside with a field of detection positions that can be detected by the sensor units while the load carrier is received in a target orientation with respect to the bearing surface.

17. The system according to claim 16, wherein either a metallic surface or a bore is present at the detection positions.

18. The system according to claim 16, wherein the field of detection positions comprises one, two or four identical fields of detection positions.

19. The system according to claim 16, wherein the detection positions to be used for determining the load carrier code comprise a first detection position in which the predetermined property is present and a second detection position in which the predetermined property is not present.

20. A method for detecting a load carrier supported on an underride shuttle comprising:
- detecting, by a field of sensor units arranged on an outer side of the underride shuttle, respective detection positions of a load carrier;
- outputting, by the sensor units, corresponding sensor bits depending on the respective detection result by the sensor units;
- determining, by an evaluation unit located on the underride shuttle, a load carrier code from the sensor bits; and
- determining, by the evaluation unit, the load carrier type of a currently worn load carrier based on the load carrier code and data stored in a memory unit.

21. The method according to claim 20, further comprising raising the load carrier prior to detecting by the sensor units the detection positions of the load carrier.

22. The method according to claim 20, further comprising outputting, by the evaluation unit, an instruction for adapting at least one operating parameter depending on the load carrier type derived by the evaluation unit.

23. The method according to claim 20, wherein a portion of the sensor bits is used for determining the load carrier code, and a plausibility check of the determined load carrier code is performed based in part on the remaining sensor bits.

24. The method according to claim 23, wherein the sensor bits used for the plausibility check of the determined load carrier code represent an amount of sensor bits used for determining the load carrier code in which a predetermined property is present.

25. The method according to claim 23, wherein a corresponding error message is output by the evaluation unit when a non-plausible load carrier code is determined by way of the plausibility check.

26. The method according to claim 20, wherein a group of three sensor bits is used to determine the load carrier code and a group of two sensor bits is used in a plausibility check to check plausibility of the load carrier code, wherein in each of the group of three sensor bits and the group of two sensor bits, at least one zero-bit and one one-bit are present, and wherein the sensor bits represent an amount of one-bits in the sensor bits for the plausibility check.

* * * * *